United States Patent [19]

Kestel

[11] 4,019,753
[45] Apr. 26, 1977

[54] ADJUSTABLE THREE-POINT TRACTOR HITCH

[76] Inventor: Frederick J. Kestel, Rte. 1, Box 44, New Lenox, Ill. 60451

[22] Filed: Nov. 13, 1975

[21] Appl. No.: 631,741

[52] U.S. Cl. .......................... 280/415 A; 172/248; 172/272; 280/479 R
[51] Int. Cl.² .......................................... B60D 1/10
[58] Field of Search ...... 280/456 A, 460 A, 461 A, 280/479 R, 415 A; 172/248, 272

[56] References Cited

UNITED STATES PATENTS

| 3,090,639 | 5/1963 | Virtue | 280/479 R |
|---|---|---|---|
| 3,116,075 | 12/1963 | Hershman | 280/479 R |
| 3,528,685 | 9/1970 | Eastman | 280/461 A |
| 3,531,140 | 9/1970 | Di Vita et al. | 280/479 R |
| 3,572,759 | 3/1971 | Baugh | 280/461 A |

FOREIGN PATENTS OR APPLICATIONS 668,072   8/1963   Canada .......................... 280/461 A Primary Examiner—Joseph F. Peters, Jr.
Assistant Examiner—John A. Pekar
Attorney, Agent, or Firm—Edward C. Threedy

[57] ABSTRACT

A tractor implement attaching hitch mechanism of the three-point type that utilizes a hydraulic actuator for readily adjusting the attaching mechanism out of a vertical plane, whereby the remotely controlled latches may be activated for attaching the implement to the tractor.

The hitch mechanism comprises a frame including a pair of depending legs interconnected by a horizontal support member. The support member and one of the legs include brackets which are connected to two draft links of the tractor, and the other leg is connected to the other draft link by a link member which is pivotally connected to the leg and the draft link. The hydraulic actuator is carried by the support member and connected to the link member for pivoting the link member so as to vertically move the leg to vary the plane of the hitch mechanism relative to the tractor.

6 Claims, 3 Drawing Figures

ADJUSTABLE THREE-POINT TRACTOR HITCH

SUMMARY OF THE INVENTION

The three-point tractor implement attaching mechanism has been widely accepted for readily attaching mounted and semi-mounted implements to a tractor. In the conventional system the tractor is equipped with a pair of trailing draft links universally pivoted at their forward ends onto a tractor body and pivoted to a pair of spaced points on the implement by pin and socket connections. A third link located above and between the draft links, interconnects, the implement to an upper hitch point on the tractor.

Typically, these quick-hitch attachments comprise rigid frames coupled to the links of the three hitch links coupled to the tractor and having rearwardly extending latch means to receive and latch the three spaced draft pins on the front of the implement. However, not all implements have the same draft pin size, and therefore it is necessary to provide different means for latching the same to the hitch attachment.

In the present invention, the hitch attachment consists of a frame providing three different points of attachment to the hitch linkage provided by the tractor as well as three points of connection to the implement to be attached thereto. Two of the latch means are provided with remotely actuated locking mechanisms for securing the implement to the hitch attachment. The hitch attachment is also provided with hydraulic means whereby the same may be adjusted out of a vertical plane so as to vary the location of the latch mechanisms with respect to the implement.

GENERAL DESCRIPTION

The invention will be best understood by reference to the accompanying drawings showing the preferred form of construction and one which readily attains the objects of the invention, and in which.

Figure 1:
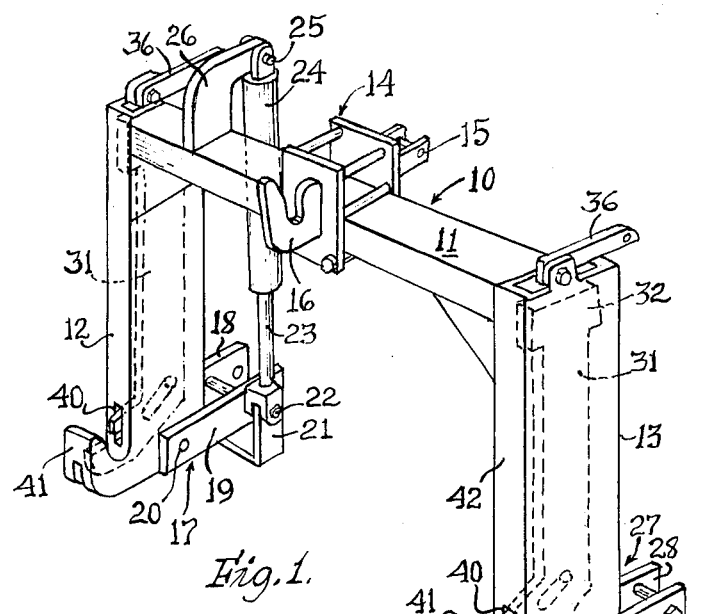
FIG. 1 is a perspective view of the hitch attachment of this invention.

The hitch attachment 10, as seen in FIG. 1, consists of a channel-shaped crossbar 11 terminating at each end into depending hollow legs 12 and 13.

Connected intermediate the ends of the crossbar 11 is a bracket 14 which provides at the forward end of the hitch attachment 10 a pin connection 15 which is adapted to be linked to the upper trailing draft link provided by the tractor (not shown). Provided by the rear face of the bracket 14 is a hook 16 for ready connection to the center draft link of the implement (not shown).

To the base of the leg 12 there is mounted a connecting bracket 17 which consists of two plates 18 and 19 pivotally connected by means of nut and bolt 20 to the base of the leg 12 and which provide at their opposite free ends, means affording pivotal connection to one of the trailing hitch links provided by the tractor. This bracket 17 also provides at one side thereof an L-shaped brace 21 which is pivotally connected as at 22 to the free end of a piston 23 of a hydraulic cylinder 24. The hydraulic cylinder 24 is pivotally connected as at 25 to the free end of an L-shaped support 26 carried by the crossbar 11.

The other leg 13 provides a connecting bracket 27 which consists of a pair of plates 28 and 29 fixedly connected to the base of the leg 13 and which also provide means 30 by which the remaining trailing hitch link provided by the tractor is linked to the hitch attachment 10.

Each of the legs 12 and 13 provides therein identical quick-latch members for releasably connecting the implement to the hitch attachment 10. These latch members are identical, and therefore only one will be described.

Figure 2:
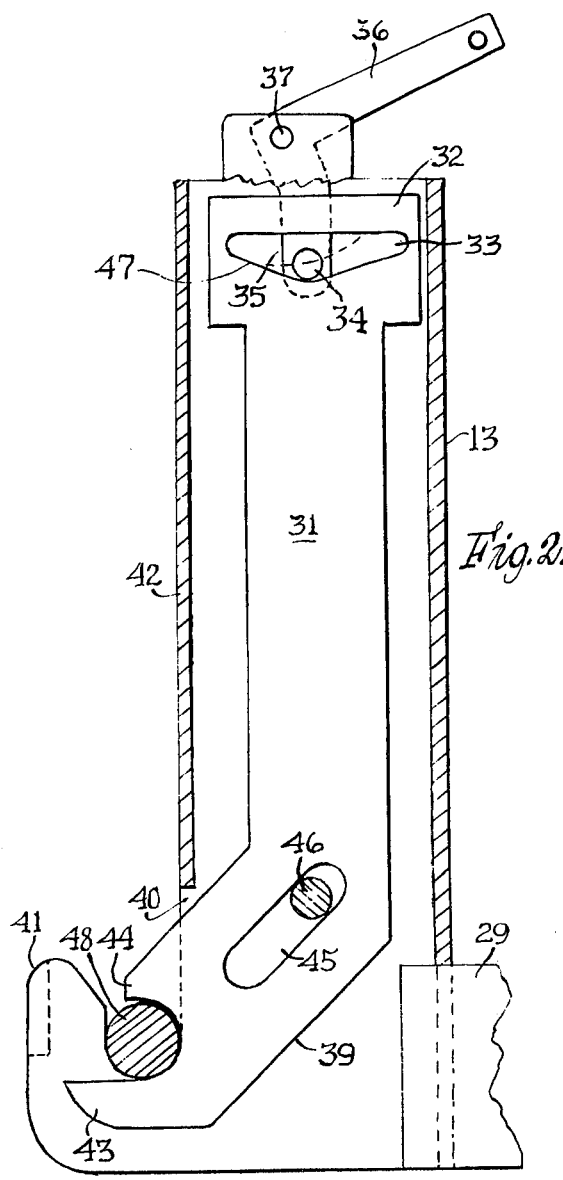
FIG. 2 is a fragmentary side elevational detailed view of the quick-latch mechanism of the invention for accommodating one size of connecting pins.

Referring to FIG. 2, there is shown a latch lever 31 contained within the hollow leg 13. The latch lever 31 provides a rectangular head 32 which is provided with a slot 33 that receives an actuating pin 34 carried at one end 35 of a generally L-shaped actuator 36. The actuator 36 is pivotally connected as at 37 to an upstanding support 38 provided by the top edge of the leg 13. A portion 39 of the latch lever 31 is formed to be disposed out of the normal plane of the latch lever 31 so as to have its free end projecting out of the opening 40 provided by the hollow leg 13. The hollow leg 13 adjacent to the opening 40 provides an upstanding finger 41 which is laterally spaced with respect to the longitudinal side edge 42 of the leg 13, as seen in the drawings. The free end of the angular portion 39 of the latch lever 31 is provided with a toe 43, the base of which is curved as it meets with a latch finger 44, all of which is adapted to project out of the opening 40, as shown.

Formed in the angular portion 39 of the latch lever 31 is a guide slot 45 which receives a stationary guide pin 46 extending transversely between the two side walls of the hollow leg 13. From the foregoing, it is apparent that the pin 34 of the actuator 36 may, by movement of the actuator 36 about its pivot connection 37, be caused to move through an arcuate path as shown in dotted lines in FIGS. 2 and 3. By this movement, the displacement of the toe 43 and the latch finger 44 through the opening 40 with respect to the upstanding finger 41, can be determined. For example, as seen in FIG. 2, when the actuator 36 has been moved into the position shown, the actuating pin 34 will be at the lowermost point on the bottom angled edge 47 of the slot 33. This will have permitted the latch lever 31 under its own weight to move within the leg 13 such that the guide pin 46 moving through the guide slot 45 permits the latch lever 31 to engage the connecting pin 48 provided by the implement to be connected to the hitch attachment 10.

Figure 3:
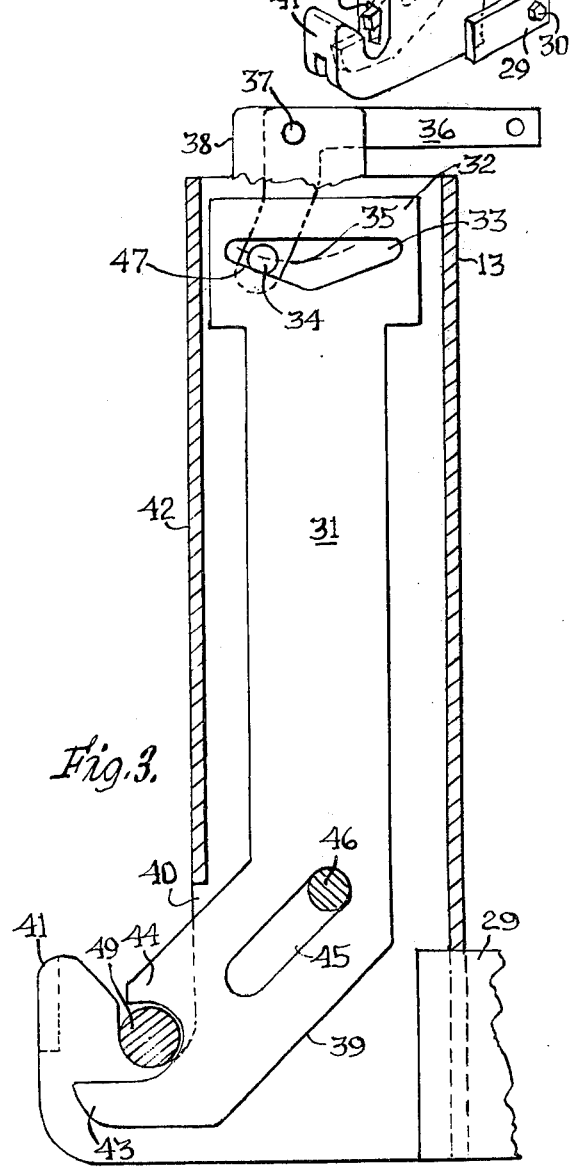
FIG. 3 is a side elevational detailed view, similar to FIG. 2, showing the quick-latch mechanism adapted to receive and hold a different size connecting pin.

In the event that the implement connecting pin as shown at 49 in FIG. 3, is of a smaller diameter than that of the pin 48, the actuating lever 36 will be pivoted to the position shown in such Figure, wherein the pin 34 will have engaged one portion of the angled surface of the slot 33 as the pin 34 is moved through its arcuate path, permitting the latch lever 31 to move through the leg 13 until the guide pin 46 comes to rest at the end of the guide slot 45, thus further projecting the toe 43 and latch finger 44 out of the opening 40, as shown in FIG. 3.

When the actuator 36 is pivoted in a counterclockwise direction as shown, until it is in a substantially vertical position such that the pin 34 has moved in an opposite direction through its arcuate path, it will cause the lever 31 to move upwardly in the leg 13 such that the guide pin 46 will guide the toe 43 and latch finger 44 inwardly of the opening 40 to a position where it will readily accept the pin 48 of the hitch 10 to be connected to the implement.

When it becomes necessary to change the vertical disposition of the points of connection between the hitch attachment 10 and the implement, the hydraulic cylinder 24 may be activated so as to expel the piston 23 therefrom. This movement will cause the collapse of the bracket 17 connected to the leg 12, which in turn will cause pivotal movement between the brackets 14 and 27 and their respective attachment to the trailing hitch links of the tractor. This movement will cause a reactive movement to the hitch attachment 10 into a tilted position where it may readily receive the connecting pins between the hitch attachment 10 and the implement to be connected thereto.

It should be noted that the actuators 36 may be individually connected to a remote operating means such that the operator of the tractor need not alight from the tractor to effect the latching operation thereof.

From the foregoing, it is apparent that I have provided a new and novel adjustable three-point quick-latch tractor hitch that permits remote connection or disconnection between the implement to be drawn by the tractor and the tractor itself.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An adjustable quick-latch hitch for tractors providing three-point draft link connections comprising
   a. a hitch attachment comprising a rigid frame including a pair of depending legs interconnected by a substantially horizontal support member,
   b. said support member and one of said legs providing connecting brackets adapted to be connected to corresponding draft links of the tractor for connecting said attachment thereto,
   c. a link member pivotally connected at one end to said other of said legs and at its opposite end to a draft link of the tractor,
   d. pivoting means carried by said support member and connected to said link member for pivoting the same relative to its connection to said other of said legs and to the draft link of the tractor so as to vertically move said other of said legs to vary the plane of said hitch attachment relative to the tractor, and
   e. means provided by each of said legs for releasably connecting said hitch attachment to an implement to be pulled thereby.

2. In an adjustable three-point quick-latch tractor hitch as defined by claim 1, wherein said pivoting means comprises a hydraulic cylinder having a slidable piston, one end of which is pivotally connected to said link member, with said cylinder being adapted for remote operation.

3. In an adjustable three-point quick-latch tractor hitch as defined by claim 1, wherein said means for releasably connecting said hitch attachment to an implement comprises a pair of slidable latch fingers contained within each of said legs and providing at one end a catch for latching an implement to the hitch attachment.

4. In an adjustable three-point quick-latch tractor hitch as defined by claim 3, wherein said pivoting means comprises a hydraulic cylinder having a slidable piston, one end of which is pivotally connected to said link member, with said cylinder being adapted for remote operation.

5. In an adjustable three-point quick-latch tractor hitch as defined by claim 3, wherein said slidable latch fingers are provided at their opposite ends with actuating levers adapted to be remotely operated for slidably moving said latch fingers relative to said legs into and out of latching position.

6. In an adjustable three-point quick-latch tractor hitch as defined by claim 1, the further provision of means for remotely operating said releasable connecting means.

* * * * *